April 30, 1968 N. R. HARRIS 3,381,266
STACKING OF SEISMIC TRACES HAVING COMMON OFFSET DISTANCES
Filed Sept. 27, 1965 3 Sheets-Sheet 3

United States Patent Office 3,381,266
Patented Apr. 30, 1968

3,381,266
STACKING OF SEISMIC TRACES HAVING
COMMON OFFSET DISTANCES
Norris R. Harris, Ankara, Turkey, assignor to Mobil Oil
Corporation, a corporation of New York
Filed Sept. 27, 1965, Ser. No. 490,484
3 Claims. (Cl. 340—15.5)

ABSTRACT OF THE DISCLOSURE

The specification discloses a method for compositing and displaying seismic traces obtained with multiple coverage field techniques as an aid in evaluating normal moveout curves and identifying primary and multiple reflections. Seismic traces obtained with the same shot-detector distances but representing horizontally spaced subsurface reflecting points are composited to produce a series of output signals. These output signals are then recorded in side-by-side relation. Since the traces composited have the same shot-detector distances, they have the same normal moveout characteristic. Thus, upon compositing, primary and multiple reflections will add in phase and be enhanced while random noise will be attenuated.

BACKGROUND OF THE INVENTION

This invention relates to seismic exploration and, more particularly, to a method of seismic exploration in which random noise may be reduced on seismic data while preserving coherent noise and primary reflections. Since the method is particularly adaptable to use in multiple coverage or common depth point exploration, it will be described with reference to such techniques.

In common depth point (CDP) exploration, field techniques are chosen so that there are produced a plurality of seismic signals including reflections from common subsurface depth points. The CDP signals are composited, after normal moveout correction, on the theory that primary reflections will add in phase and be enhanced while random noise will be degraded relative to the primaries. Coherent noise, such as multiples, may also be attentuated using the CDP compositing technique because the coherent noise does not exhibit the same normal moveout between the CDP traces as the primaries so that the coherent noise wavelets fail to add in phase.

One of the most bothersome of the coherent noise-wave events in seismic data is the multiple reflections. In the elimination of multiple reflections, long offset distances are generally required between the seismic source and the detector spread. These long offset distances allow enough residual normal moveout of multiples between CDP traces upon being composited or stacked to permit cancellation of the multiples. Before any of the CDP traces can be stacked, each must be normal moveout corrected to a reference distance between shotpoint and detector. The normal moveout curves derived for performing the process use velocity calculations made from a well geophone survey in the area or perhaps from expanding-spread data. Once a normal moveout curve has been derived for a given exploration traverse, it is generally used for correcting all of the CDP traces in a processing center.

Due to the long offset distances used in common depth point exploration, the velocity calculations used in the normal moveout process are extremely critical. Errors of a few hundred feet can cause the obliteration of primaries on CDP traces upon stacking. In fact, an erroneous normal moveout correction may actually cause the enhancement of multiples and the attenuation of primaries. By inspection of a composite record section, a seismologist cannot know for sure whether primaries have been attenuated due to normal moveout error. A record section of single coverage may still give no clues to the normal moveout error because random noise obscures both primary reflections and coherent noise. The prior art has believed it necessary to composite CDP traces as a first step in reducing random noise and enhancing primaries.

SUMMARY OF THE INVENTION

It is the primary object of the present invention to reduce random noise in seismic data to unmask hidden primary reflections but without attenuating multiple reflections or other coherent noise.

Another object of the invention is to provide a check of normal moveout calculations before the stacking of common depth point signals.

This invention may be practiced by generating seismic energy sequentially at a series of equidistant shot points and receiving the seismic energy reflected upwardly from subsurface beds to a group of equidistant detecting points. The seismic energy received at each of the detecting points is converted into a corresponding electrical signal. Then the electrical signals, representing seismic energy converted at detecting points spaced the same distance from their respective associated shot points and representing seismic energy reflected from horizontally spaced subsurface reflecting points, are combined to produce a series of output signals. These output signals are then visually recorded in side-by-side relation. Since the signals combined have the same shot-detector distance, they have the same normal moveout characteristics. Thus, upon compositing, primary reflections and multiple reflections will add in phase and be enhanced, while random noise will be attenuated.

With the random noise reduced, velocity error calculations can be made from the primary reflections and compared with reference velocity data to determine the accuracy of normal moveout curves. Also, multiples can be identified. If the multiples have the proper frequency, steps may be taken to eliminate them by filtering. At the very least, the identification of the multiples allows checking of theoretical calculations as to their origin.

DETAILED DESCRIPTION OF SPECIFIC EMBODIMENTS

Figure 1:
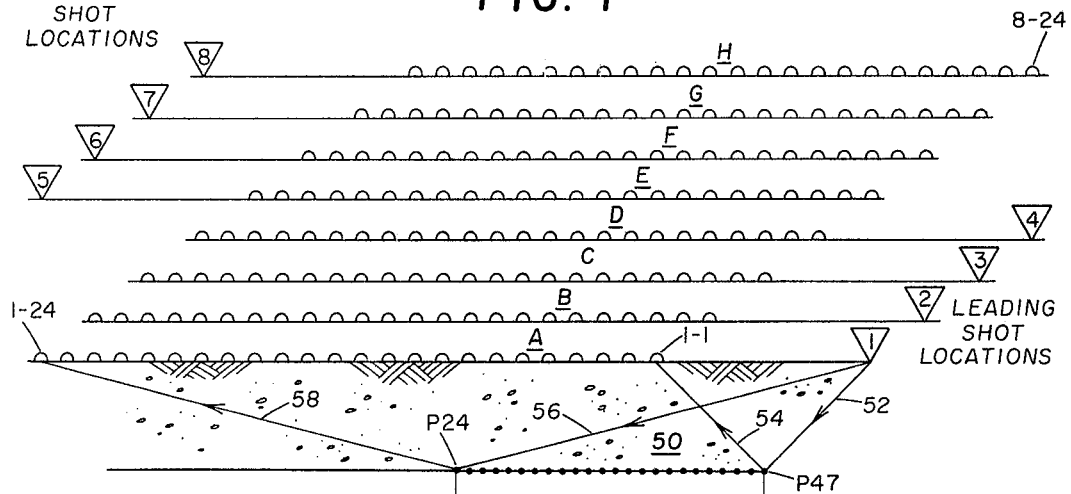
FIGURE 1 is a sequence of eight field diagrams of a skip continuous, multiple coverage profiling technique which may be employed in carrying out the invention.

Referring now to FIGURE 1, there is illustrated a bilateral field technique such as might be used for producing sixfold multiple coverage and which is suitable for use in carrying out my invention. The sequence of shots and recordings travels from left to right in the figure, with the field setups each being placed one above another for ease in representing the overlapping coverage.

In a first field setup along an exploration traverse, seismic energy such as that produced by the explosion of dynamite or the drop of a heavy weight is applied to the earth at shotpoint 1 and reflections are recorded at detector spread A, containing twenty-four detector stations. The individual detector stations may contain many separate geophones, electrically connected to produce a single output. In one embodiment, the offset distance between the shotpoint and the nearest detector station was 2,640 feet and the detector station spacing was 220 feet.

When energy is applied at shotpoint 1, detector spread A receives reflections from subsurface horizon 50. Of course, detector spread A receives reflections from other subsurface horizons, perhaps above and below horizon 50, but only horizon 50 is indicated for clarity. Horizon 50 may be considered as composed of a series of depth points or reflecting points, each one being delineated by a separate detector station in spread A. For example, a signal or trace produced from the output of the near detector station 1–1 delineates depth point P47. Throughout the specification, reference characters identifying detector stations or traces recorded at detector stations give the shotpoint number first and then the detector or trace number. Energy travels downward from shotpoint 1 by way of ray path 52 and is reflected upward to detector station 1–1 by way of ray path 54. Likewise, energy travels downward by way of ray path 56 to depth point P24 where the energy is reflected upward by way of ray path 58 to the far detector station 1–24. It is to be understood that a reproducible recording is made from each of the detector stations in spread A. Usually in seismic exploration, magnetic tape recordings are made on a multichannel recording drum of each of the signal outputs of the detector stations.

Now for a second recording, the detector spread advances the spacing of two detector stations to become spread B. Likewise, the shotpoint advances two detector station spacings to shotpoint 2. Again, a multichannel recording is made from the reflections received at each of the detector stations in spread B. The ray paths and depth points for this and subsequent field diagrams are not shown for simplicity.

The process of moving the detector spread up two station spacings between recordings continues through spread setup D and shotpoint 4. The shotpoint continues to lead the detector spread through shotpoint 4. For a next recording, however, the detector spread moves to position F, but the shotpoint is moved to a trailing location at shotpoint 5. The purpose of having the shotpoint at both ends of the detector spreads is to provide bilateral data for producing a bilateral record section, as will be subsequently understood. For the detector spread setup at E and for the three succeeding spread setups F through H, as indicated, the shotpoint continues to trail the detector spread. It will be appreciated that there is produced sixfold, overlapping subsurface coverage as the detector spread advances through spreads A through H.

Figure 2:
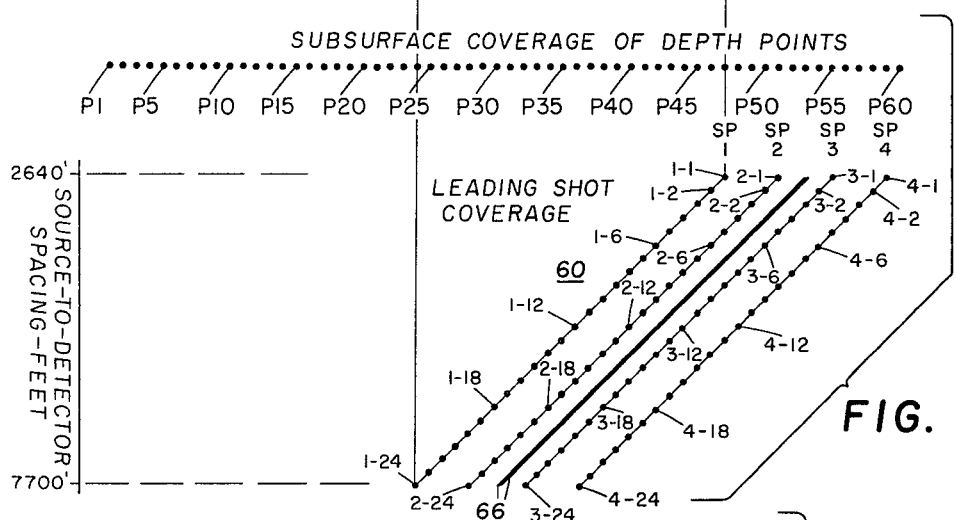
FIGURE 2 is a grid diagram of the subsurface coverage of depth points produced with the leading shotpoint locations in the field diagram of FIGURE 1.

For a detailed picture of the subsurface coverage produced from leading shot locations 1 through 4, refer now also to FIGURE 2, where there is shown a grid diagram of the depth points delineated on each recording setup. For example, the depth points located on horizon 50 are projected downward to the heavy dots on slanting line 60 positioned at a 45° angle to the horizontal. The top horizontal scale in FIGURE 2 represents subsurface depth points which are given the numbers P1 through P60. The top horizontal scale is also proportional to the actual distance along the earth's surface wherein the depth points are located. Although the heavy dots indicating the depth points along slanting line 60 are geometrically representative of depth points, they may be referred to and thought of as recorded traces because the recorded traces from shotpoint 1 delineate, respectively, those depth points located along line 60. The remaining slanting lines parallel to and to the right of line 60 represent, respectively and as indicated, the subsurface depth point coverage of the traces recorded for shotpoints 2 through 4.

The left-hand vertical scale in FIGURE 2 indicates the source-to-detector spacing originally used in the field setup of FIGURE 1 for producing the traces located along the slanting lines. With the two-dimensional grid diagram of FIGURE 2, it is possible to view overlapping subsurface coverage as well as the distance from the source to the detector giving rise to each of the respective traces.

In accordance with my invention, several traces originally recorded with substantially equal source-to-detector spacings are combined to produce a single trace, free of random noise. For example, trace 1–1 is combined with traces 2–1, 3–1, and 4–1. As indicated, these traces were recorded at the same offset distance to the shotpoint of 2,640 feet.

Figure 3:
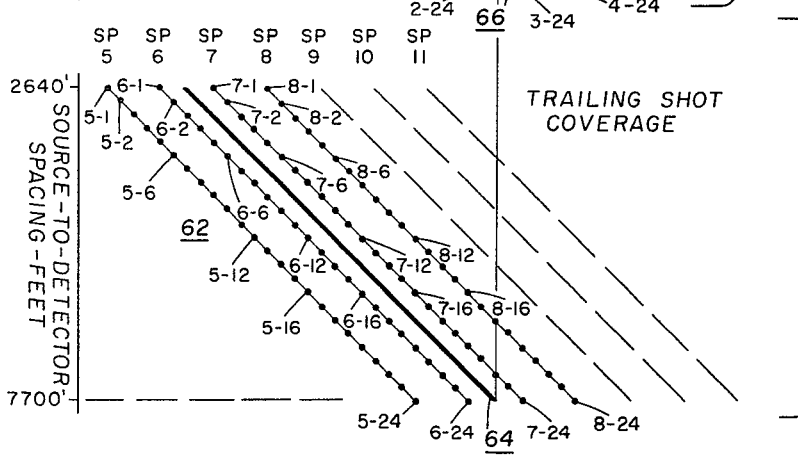
FIGURE 3 is a grid diagram of the subsurface coverage of depth points produced with the trailing shotpoint locations in the field diagram of FIGURE 1.

Since a bilateral record section or presentation is generally preferred by seismologists in interpreting record sections, the field setups of FIGURE 1 were chosen to produce bilateral data. The trailing subsurface coverage produced from shotpoint locations 5 through 8 is illustrated by the grid diagram of FIGURE 3. Subsurface depth points delineated for the shotpoint setups 5 through 8 are projected downward onto another series of slanting parallel lines inclined to the horizontal at 45°. For example, along line 62, the heavy dots are indicative of depth points delineated by the recordings of shotpoint 5 shooting into spread E. Here again the depth points may be thought of as recorded traces. Depth points delineated on further shotpoint setups in the sequence of FIGURE 1 are indicated by the heavy dots on the slanting lines to the right of line 62. FIGURE 3 uses the same horizontal scale as the top horizontal scale of FIGURE 2 illustrating the depth points. The left-hand vertical scale in FIGURE 3 indicates the source-to-detector spacings which produced the traces indicated by the heavy dots along the slanting lines.

Consider now how a multisignal record section would be written or produced using well-known equipment and using the principles of my invention. When I refer to a seismic record section, I mean any type of visual presentation of the subsurface layering of the earth, e.g., wiggle trace, variable area or variable density. Writing the traces on the record section from left to right, the first trace placed at the left-hand margin is a composite of traces 5–1, 6–1, 7–1, and 8–1, to give fourfold common offset-distance (COD) coverage. Notice that all four of these traces were recorded with a source-to-detector spacing of 2,640 feet. Adjacent the preceding combined trace, there is written a composite of traces 5–2, 6–2, 7–2, and 8–2. The sequence of writing combined, fourfold COD traces represented by the heavy dots at the same vertical scale distance on the slanting lines continues from left to right downward along the traces indicated. Finally, a twenty-fourth COD trace is written from a composite of traces 5–24, 6–24, 7–24, and 8–24.

Now there is written the data produced from a composite of the traces obtained with the leading shot coverage indicated on the slanting lines of FIGURE 2. The process of writing traces from left to right continues with the writing of a composite of traces 1–24, 2–24, 3–24, and 4–24. Further writing of the traces continues upward and to the right on the slanting lines of FIGURE 2 by compositing fourfold COD traces indicated by the dots on the slanting lines at the same vertical scale distance.

The compositing and record section writing process described above produces a subsurface coverage which is an average over the subsurface of the individual combined traces. The lateral spacing between the traces is proportional, however, to the field position of the average subsurface reflecting points included on each combined signal. For instance, the compositing of COD traces among those recorded at shotpoints 5 through 8 produces an average subsurface coverage as indicated by the heavy slanting line 64 in FIGURE 3. The average subsurface coverage produced by compositing respective COD traces recorded at shotpoints 1 through 4 is represented by the heavy slanting line 66 in FIGURE 2.

Preferably, the compositing of COD traces to reduce random noise is performed so that the average subsurface coverage is continuous on the record section. For example, the compositing should preferably be done so that there is no gap in the horizontal distance between the lower end of average-coverage line 64 and the lower end of average-coverage line 66.

Figure 4:
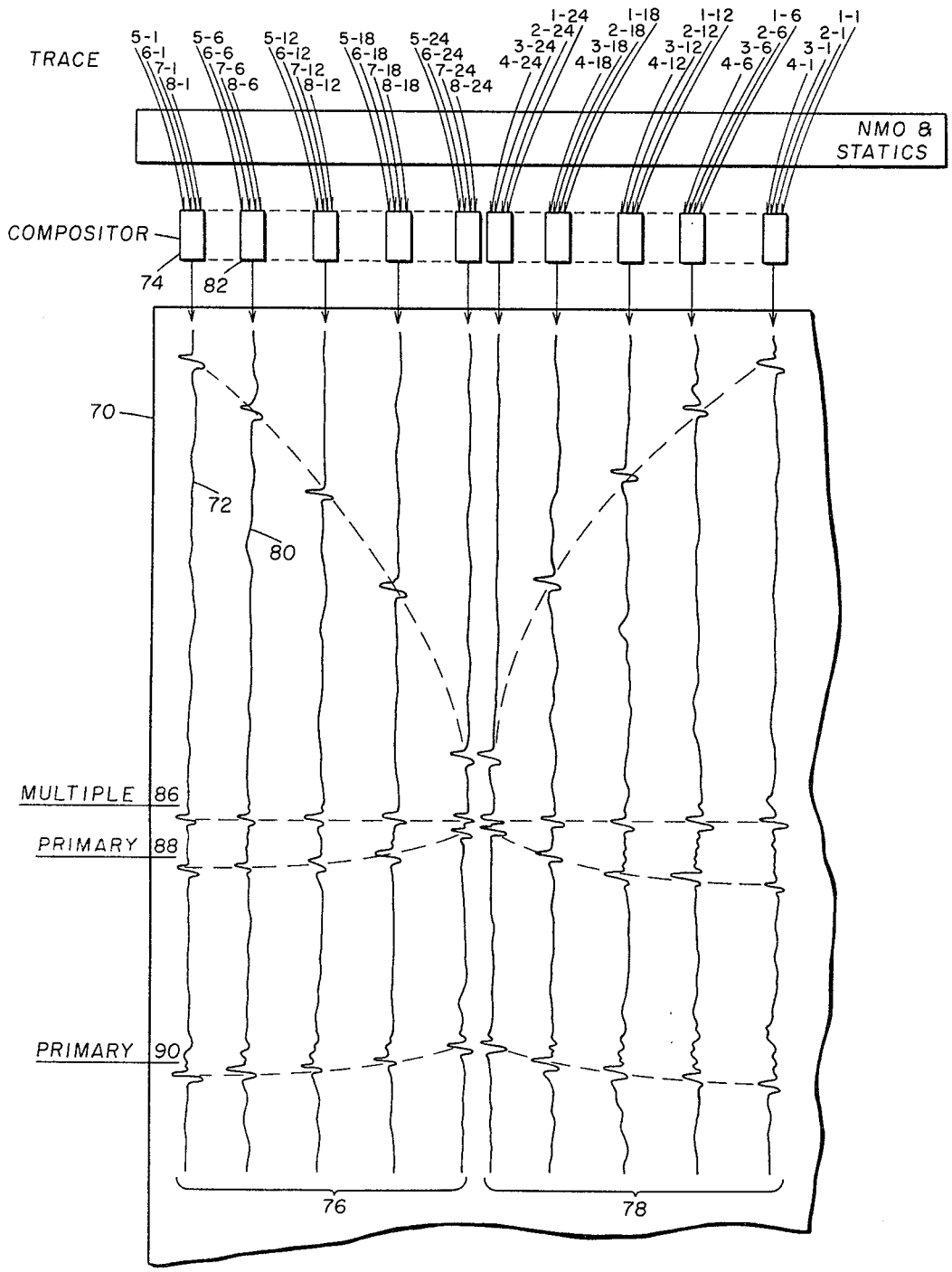
FIGURE 4 is a portion of a record section produced in accordance with the invention by following the compositing techniques of FIGURES 2 and 3.

For a more graphic illustration of the process of compositing and re-recording COD traces, refer now to FIGURE 4. A portion of a wiggle trace record section 70 is written in accordance with the schedule of FIGURES 2 and 3. As indicated, normal moveout and static corrections are applied to each of the traces before compositing. While it is not necessary to normal moveout or static correct each COD trace before compositing, it is generally done in processing centers as a routine first step in order to prepare traces for common depth point stacking. At the left-hand margin of record section 70 is written trace 72 which is combined in compositor 74 from traces 5–1, 6–1, 7–1, and 8–1. Only the first, sixth, twelfth, eighteenth, and twenty-fourth traces in sections 76 and 78 of the record section are illustrated to simplify the figure. It will be understood that intervening traces are also recorded according to the schedule of FIGURES 2 and 3. The sixth trace to the right, trace 80, is combined from traces 5–6, 6–6, 7–6, and 8–6 in compositor 82. The remainder of the traces in record section 70 are combined from COD traces as indicated. As illustrated, the fourfold COD record section 70 contains a multiple event 86, a primary event 88, and a second primary event 90. The random noise on the traces has been substantially attenuated.

Figure 5:
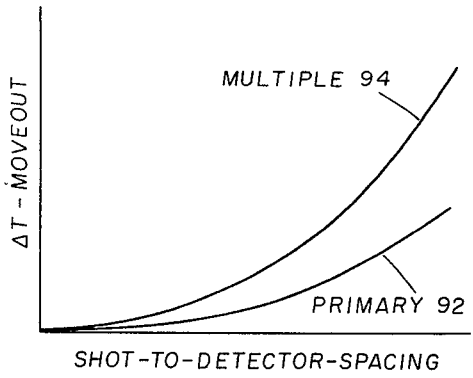
FIGURE 5 is a graph of the normal moveout of a multiple and a primary at a given record time as a function of the shot-to-detector spacing.

The reasons for the cancellation of random noise and the enhancement of multiples and primaries may be better seen by referring to FIGURE 5. Therein the normal moveout of a primary at a given record time and a multiple at the same record time are indicated by curves 92 and 94, respectively, as a function of the shot-to-detector spacing. The primary event 92 exhibits less normal moveout than the multiple event 94 due to the increase in average velocity with depth in the earth. Traces recorded at detector stations with common offset distances have identical normal moveout among them of both primaries and multiples. Therefore, when COD traces are composited, both primaries and multiples add in phase with themselves and are enhanced. However, random noise has no coincidence among the COD traces and will be degraded relative to the multiples and primaries.

Turning again to FIGURE 4, it will be noted that primary event 88 has been over normal moveout corrected to indicate curving subsurface beds instead of flat beds, whereas the multiple event 86 has been corrected so that the event is flat. Primary event 90 at a longer record time has also been over corrected. It will be apparent that if the traces on record section 70 had been composited using common depth point techniques, the primary events 88 and 90 would have been partially canceled and the multiple event 86 would have been enhanced. In accordance with my invention, there is provided a continuous check on velocity calculations to give advanced notice that the normal moveout adjusting curve is erroneous before primary reflections are wiped out on the common depth point composited record section.

Figure 6:
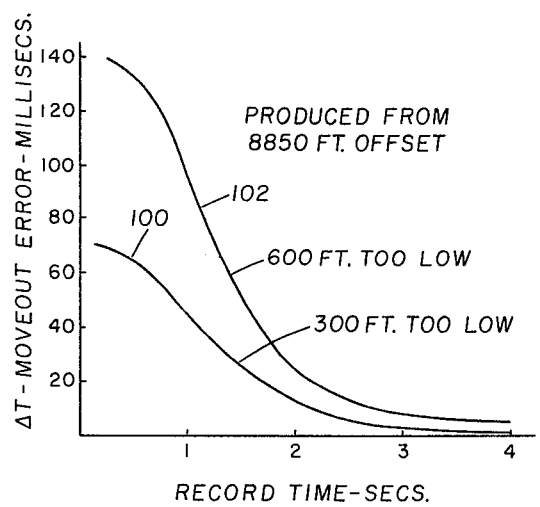
FIGURE 6 illustrates graphs of the normal moveout error caused by erroneous velocity information as a function of record time.

The seriousness of erroneous velocity information in compositing CDP traces is better seen by referring to FIGURE 6. Therein is plotted the normal moveout error for a typical area of the earth as a function of record time for two velocity errors and with a source-to-detector spacing of 8,850 feet. A first curve 100 represents the normal error created by velocity information that was 300 feet too low. A second curve 102 represents the normal moveout error created by velocity error that was 600 feet too low. It will be appreciated that even at a record time of three seconds, a 600-foot velocity error causes a normal moveout error of about eight milliseconds. Such normal moveout is serious enough to cause partial cancellation of primary events at this record time. At a record time of one second, the problem is even more serious where, as indicated by curve 102, a velocity calculation 600 feet too low produces a normal moveout error of about 95 milliseconds which is sufficient to obliterate a primary event between CDP stacked traces.

On the basis of velocity error calculations produced from a study of record section 70, the normal moveout adjusting curve may be corrected to the proper velocity values. Furthermore, as seismic data is gathered in the field, record sections produced from COD traces may provide a continuous check of the velocity information without the need for further well geophone surveys or expanding spread field techniques.

While the method of my invention has been described above with reference to a fourfold stack of COD traces, it will be apparent that other numbers of COD traces may be used. The number of fold stacking is limited primarily by the amount of dip exhibited among the COD traces. COD traces including primary or multiple wavelets at a record time of interest should have a dip of less than one-half wavelength, and preferably the dip should be less than one-quarter wavelength.

Whenever the dip among the COD traces exceeds the quarter wavelength limitation, an incremental static time shift or tilt can be applied to each trace to allow them to stack properly. For example, in FIGURE 3, assume that the wavelets of a primary reflection at a time of interest have a time shift of eight milliseconds between the traces for shotpoint 5 and the traces for shotpoint 6. The wavelet, indicative of a dipping bed, may also appear on the traces for the shotpoints 6 through 8 and may exhibit a dip of eight milliseconds between each shotpoint. To allow proper stacking of COD traces for the shotpoints, an incremental time shift may be applied to the traces of each shotpoint before stacking. More specifically, an eight-millisecond time shift may be applied to the traces of shotpoint 6. A 16-millisecond shift may be applied to the traces of shotpoint 7, and so on. With this incremental time shift applied to each of the traces, the COD traces may be stacked and formed into a record section with random noise considerably attenuated. A seismologist then may take into account the tilt of the record section in identifying multiples and primaries and calculating velocity errors.

The compositing process as described above and illustrated in FIGURE 4 may be performed by analog apparatus currently available in the art, such as described in U.S. Patent 3,181,643, issued to G. W. Ehlert et al. on May 4, 1965 Other suitable compositing means may be a digital computer, properly programed to composite digitized traces A suitable normal moveout correcting means for use in the invention is the one described in U.S. Patent 3,092,805, issued to G. D. Koeijmans on June 4, 1963. The record section writing apparatus may be that currently available from the Southwestern Industrial Electronics Company, Houston, Tex.

While a bilateral-looking record section is preferred in the practice of my invention, it should not be limited thereto. Furthermore, unilateral data gathering field techniques may be used, i.e., those in which the seismic source shoots into the same end of the detector spread. From the unilateral shot data, a bilateral record section can be produced using the method disclosed in U.S. Patent No. 3,353,152 issued on Nov. 14, 1967, to Clyde W. Kerns, a co-worker of mine.

Figure 7:
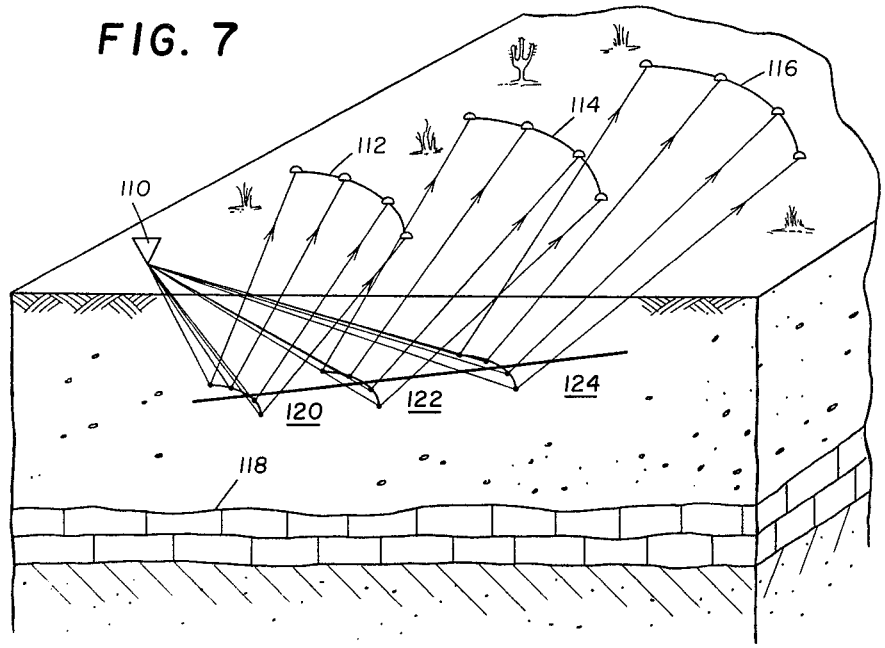
FIGURE 7 is a perspective view of a cross section of the earth illustrating a modified field diagram for carrying out the invention.

For an illustration of another field technique which may be used to gather data in accordance with my invention, refer now to FIGURE 7 where there is illustrated a perspective view of a cross section of the earth. A source of seismic energy is located at shotpoint 110 and a plurality of groups of detecting stations are located along an exploration line on arcs of circles whose centers are the shotpoint 110. As illustrated, a first group of detector stations 112 are located on an arc of a first circle whose center is the shotpoint 110 so that each of the individual detecting stations is substantially equidistant from the shotpoint. Likewise, a second and third group of detector stations 114 and 116 are located on arcs of circles. In this embodiment, compositing of COD traces may be eliminated. Each of the detector stations within each group may be electrically connected to produce a single output trace for recording. When the source at shotpoint 110 generates seismic energy, it travels downwardly to reflecting interfaces, such as, for example, interface 118. Detectors 112 receive reflections from depth points 120 located on an associated horizon arc on interface 118. Likewise, detectors 114 receive reflections from depth points 122, and detectors 116 receive reflections from depth points 124. The single-signal output of each of the groups of detecting stations is representative of the algebraic combination of the individual seismic waves received at the individual detecting stations within each group. The single-trace output of each group may then be formed into a record section where random noise is substantially attenuated, as described above, and from which velocity errors may be calculated.

It will be apparent that it is not necessary to combine or stack traces having exact common offset distances as long as each trace was recorded at substantially the same offset distance. For example, in FIGURE 7, the detector stations in each of the groups 112–116 might be placed on straight lines perpendicular to a line running through the shotpoint 110. Where the length of each group is short compared to the total distance away from the shotpoint 110, each of the individual detector stations within each group is located at substantially the same distance from the shotpoint.

Sometimes in offshore seismic exploration or even in some land operations, exact common offset distance traces are never produced. However, traces produced with offset distances which are very nearly the same have imperceptible differences in the record times of primary and multiple events. Therefore, traces having offset distances within a limiting zone may be composited in accordance with my invention. For example, traces recorded with an offset distance of between 2,000 and 2,200 feet may be composited into a single COD trace. Likewise, traces produced with an offset distance of between 2,201 and 2,400 may be composited to produce a single trace, and so on.

In view of the foregoing illustration and description of my invention, it may become apparent to those skilled in the art that certain other modifications can be made. It is intended to cover all such modifications as fall within the scope of the appended claims.

I claim:
1. In seismic exploration the method comprising the steps of:
   (a) generating seismic energy sequentially at a series of equidistant shot points and receiving the seismic energy reflected upwardly from subsurface beds to a group of equidistant detecting points,
   (b) converting the seismic energy received at each of said detecting points into corresponding electrical signals,
   (c) combining the electrical signals representative of seismic energy converted at detecting points spaced the same distances from their respective associated shot points and representing seismic energy reflected from horizontally spaced subsurface reflecting points to produce a series of output signals, whereby random noise will be attenuated on said series of output signals, but primary reflections and coherent noise will be enhanced, and
   (d) visually recording said series of output signals in side-by-side relation.

2. In seismic exploration the method comprising the steps of:
   (a) locating a first shot point and first and second detecting points along an exploration line at points so located that energy propagated from said first shot point will travel a path of first length and be reflected to said first detecting point from a first reflecting point on a subsurface bed and said energy will travel a path of second length different from said first length and be reflected to said second detecting point from a second reflecting point on said subsurface bed horizontally spaced from said first reflecting point,
   (b) generating seismic energy at said first shot point and receiving at said first and second detecting points the seismic energy reflected upwardly from said first and second reflecting points on said subsurface bed,
   (c) locating a second shot point and third and fourth detecting points along said exploration line at points so located that energy propagated from said second shot point will travel a path substantially equal to said first length but will be reflected to said third detecting point from a third reflecting point on said subsurface bed horizontally spaced from said first and second reflecting points and said energy will travel a path substantially equal to said second length but will be reflected to said fourth detecting point from a fourth reflecting point on said subsurface bed horizontally spaced from said first, second, and third reflecting points,
   (d) generating seismic energy at said second shot point and receiving at said third and fourth detecting points the seismic energy reflected upwardly from said third and fourth reflecting points on said subsurface bed,
   (e) converting the seismic energy received at each of said detecting points into corresponding electrical signals,
   (f) summing electrical signals representative of seismic energy converted at said first and third detecting points to produce a first output signal, whereby random noise will be attenuated on said first output signal, but primary reflections and coherent noise will be enhanced,
   (g) summing electrical signals representative of seismic energy converted at said second and fourth detecting points to produce a second output signal, whereby random noise will be attenuated on said second output signal, but primary reflections and coherent noise will be enhanced, and
   (h) visually recording said first and second output signals in side-by-side relation.

3. In seismic exploration wherein seismic energy is generated sequentially at a series of equidistant shot points and the seismic energy reflected upwardly from subsurface beds is received at a group of equidistant detecting points and is converted at each of said detecting points into corresponding electrical signals, the method comprising the steps of:
 (a) combining the electrical signals representative of seismic energy converted at detecting points spaced the same distances from their respective associated shot points and representing seismic energy reflected from horizontally spaced subsurface reflecting points to produce a series of output signals, whereby random noise will be attenuated on said series of output signals, but primary reflections and coherent noise will be enhanced, and
 (b) visually recording said series of output signals in side-by-side relation.

References Cited

UNITED STATES PATENTS

| | | | |
|---|---|---|---|
| 2,331,080 | 10/1943 | Petty | 181—.5 |
| 2,732,906 | 1/1956 | Mayne | 181—.5 |
| 2,759,551 | 8/1956 | Carlisle et al. | 181—.5 |
| 3,040,833 | 6/1962 | Mendenhall et al. | 181—.5 |
| 3,096,846 | 7/1963 | Savit et al. | 181—.5 |
| 3,105,568 | 10/1963 | Jolly | 181—.5 |
| 3,217,828 | 11/1965 | Mendenhall et al. | 181—.5 |
| 3,240,286 | 3/1966 | Musgrave | 181—.5 |

BENJAMIN A. BORCHELT, *Primary Examiner.*

R. M. SKOLNIK, *Assistant Examiner.*